(12) United States Patent
Lin (10) Patent No.: US 7,245,935 B2
(45) Date of Patent: Jul. 17, 2007

(54) METHOD AND APPARATUS FOR TRANSMISSION POWER CONTROL

(75) Inventor: Jie Lin, Sutton Courtenay (GB)

(73) Assignee: Motorola, Inc., Schaumburg, IL (US)

( * ) Notice: Subject to any disclaimer, the term of this patent is extended or adjusted under 35 U.S.C. 154(b) by 15 days.

(21) Appl. No.: 10/533,280

(22) PCT Filed: Nov. 10, 2003

(86) PCT No.: PCT/EP03/50812

§ 371 (c)(1),
(2), (4) Date: Apr. 28, 2005

(87) PCT Pub. No.: WO2004/056008

PCT Pub. Date: Jan. 7, 2004

(65) Prior Publication Data

US 2006/0040696 A1    Feb. 23, 2006

(30) Foreign Application Priority Data

Dec. 17, 2002 (GB) ................. 0229397.5

(51) Int. Cl.
*H04B 7/00* (2006.01)
*H04Q 7/20* (2006.01)
(52) U.S. Cl. .............. 455/522; 455/13.4; 455/68; 455/127.1
(58) Field of Classification Search ........... 455/13.4, 455/522, 68, 69, 127.1
See application file for complete search history.

(56) References Cited

U.S. PATENT DOCUMENTS

| 6,185,432 | B1 * | 2/2001 | Vembu | 455/522 |
|---|---|---|---|---|
| 6,236,863 | B1 | 5/2001 | Lyall, Jr. et al. | |
| 6,272,325 | B1 * | 8/2001 | Wiedeman et al. | 455/117 |
| 6,298,242 | B1 * | 10/2001 | Schiff | 455/522 |
| 2003/0050084 | A1 * | 3/2003 | Damnjanovic et al. | 455/522 |

FOREIGN PATENT DOCUMENTS

| EP | 1 244 227 A | | 9/2002 |
|---|---|---|---|
| WO | WO 01/31808 | * | 5/2001 |
| WO | WO 01/31808 A | | 5/2001 |

* cited by examiner

*Primary Examiner*—Nay Maung
*Assistant Examiner*—Nguyen H. Tuan (57) ABSTRACT

The invention relates to a system for power control in a cellular communication system. The power control may be operated (201) in a first mode of operation wherein power control data are determined in response to a quality parameter, such as a desired signal to noise ratio. The method further comprises entering (205) a reduced power mode of operation by communicating power down power control data between a base station and a communication unit. The base station and/or communication unit then proceeds to operate (207) in the reduced power mode by communicating power control data corresponding to a reduced transmit power level. The reduced transmit power level may specifically be zero. After a given duration, the base station and/or communication unit proceeds to exit (211) the reduced power mode by communicating power up power control data between the base station and the communication unit.

17 Claims, 2 Drawing Sheets

METHOD AND APPARATUS FOR TRANSMISSION POWER CONTROL

FIELD OF THE INVENTION

The invention relates to a method and apparatus for power control for a transmitter in a cellular communication system and in particular to a system for entering a reduced power control mode.

BACKGROUND OF THE INVENTION

Figure 1:
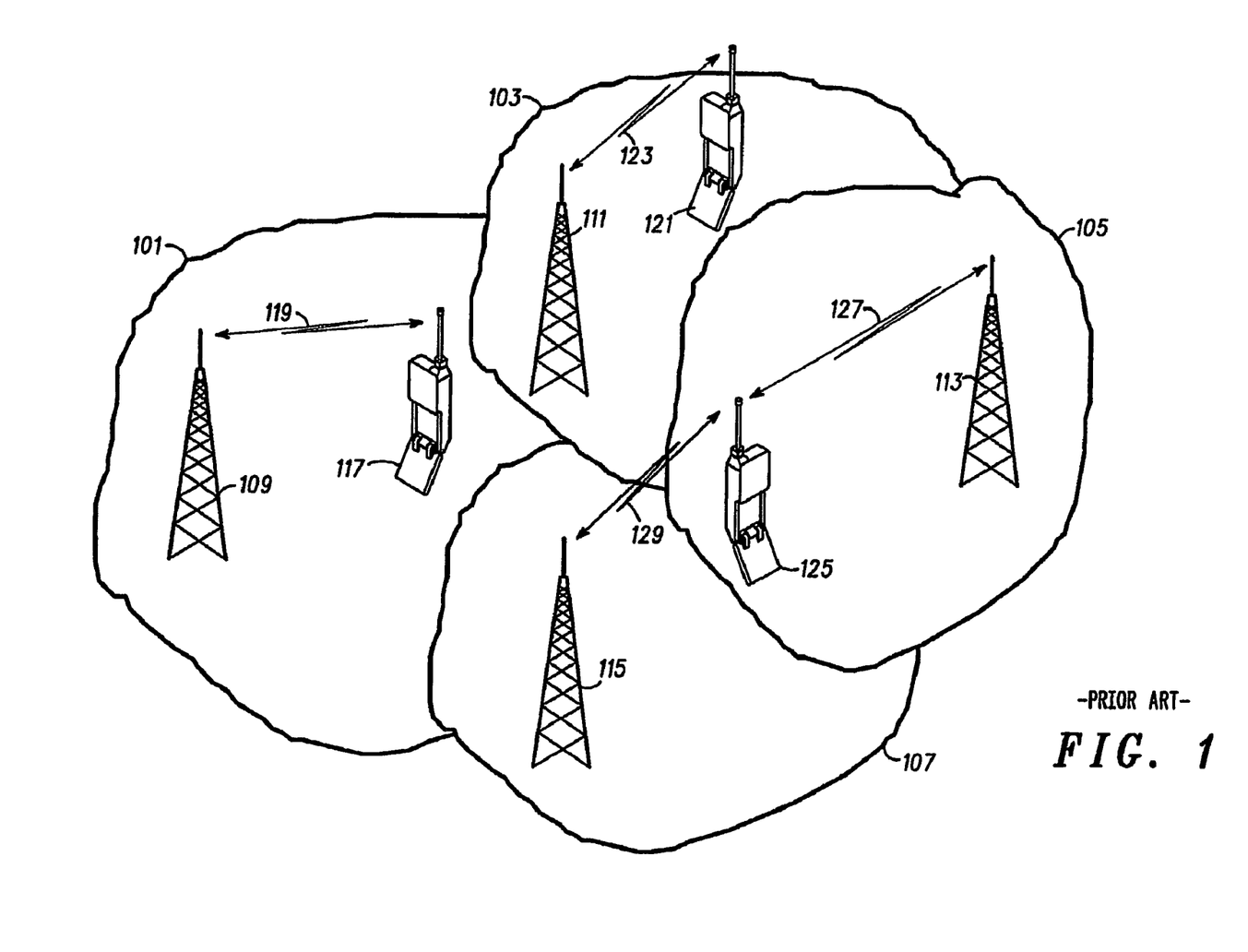
FIG. 1 is an illustration of a cellular communication system in accordance with the prior art.

FIG. 1 illustrates the principle of a conventional cellular communication system 100 in accordance with prior art. A geographical region is divided into a number of cells 101, 103, 105, 107 each of which is served by base station 109, 111, 113, 115. The base stations are interconnected by a fixed network which can communicate data between the base stations 109, 111, 113, 115. A mobile station is served via a radio communication link by the base station of the cell within which the mobile station is situated. In the example of FIG. 1, mobile station 117 is served by base station 109 over radio link 119, mobile station 121 is served by base station 111 over radio link 123 and so on.

As a mobile station moves, it may move from the coverage of one base station to the coverage of another, i.e. from one cell to another. For example mobile station 125 is initially served by base station 113 over radio link 127. As it moves towards base station 115 it enters a region of overlapping coverage of the two base stations 113 and 115 and within this overlap region it changes to be supported by base station 115 over radio link 129. As the mobile station 125 moves further into cell 107, it continues to be supported by base station 115. This is known as a handover or handoff of a mobile station between cells.

A typical cellular communication system extends coverage over typically an entire country and comprises hundreds or even thousands of cells supporting thousands or even millions of mobile stations. Communication from a mobile station to a base station is known as uplink, and communication from a base station to a mobile station is known as downlink.

The fixed network interconnecting the base stations is operable to route data between any two base stations, thereby enabling a mobile station in a cell to communicate with a mobile station in any other cell. In addition the fixed network comprises gateway functions for interconnecting to external networks such as the Public Switched Telephone Network (PSTN), thereby allowing mobile stations to communicate with landline telephones and other communication terminals connected by a landline. Furthermore, the fixed network comprises much of the functionality required for managing a conventional cellular communication network including functionality for routing data, admission control resource allocation, subscriber billing, mobile station authentication etc.

Currently the most ubiquitous cellular communication system is the $2^{nd}$ generation communication system known as the Global System for Mobile communication (GSM). GSM uses a technology known as Time Division Multiple Access (TDMA) wherein user separation is achieved by dividing frequency carriers into 8 discrete time slots, which individually can be allocated to a user. A base station may be allocated a single carrier or a multiple of carriers. One carrier is used for a pilot signal which further contains broadcast information. This carrier is used by mobile stations for measuring of the signal level of transmissions from different base stations, and the obtained information is used for determining a suitable serving cell during initial access or handovers. Further description of the GSM TDMA communication system can be found in 'The GSM System for Mobile Communications' by Michel Mouly and Marie Bernadette Pautet, Bay Foreign Language Books, 1992, ISBN 2950719007.

Currently, $3^{rd}$ generation systems are being rolled out to further enhance the communication services provided to mobile users. The most widely adopted $3_{rd}$ generation communication systems are based on Code Division Multiple Access (CDMA) wherein user separation is obtained by allocating different spreading and scrambling codes to different users on the same carrier frequency. The transmissions are spread by multiplication with the allocated codes thereby causing the signal to be spread over a wide bandwidth. At the receiver, the codes are used to de-spread the received signal thereby regenerating the original signal. Each base station has a code dedicated for a pilot and broadcast signal, and as for GSM this is used for measurements of multiple cells in order to determine a serving cell. An example of a communication system using this principle is the Universal Mobile Telecommunication System (UMTS), which is currently being deployed. Further description of CDMA and specifically of the Wideband CDMA (WCDMA) mode of UMTS can be found in 'WCDMA for UMTS', Harri Holma (editor), Antti Toskala (Editor), Wiley & Sons, 2001, ISBN 0471486876.

The frequency band allocated for a cellular communication system is typically severely limited, and therefore the resource must be effectively divided between mobile stations. A fundamental property of a cellular communication system is that the resource is divided geographically by the division into different cells. Thus, a certain amount of resource (for example a frequency band) may at a given time be allocated to a given cell thereby reducing the resource allocation to neighbouring cells. In order to optimise the capacity of a cellular communication system, it is important to minimise the impact of interference caused by or to other mobile stations. An important advantage of a cellular communication system is that due to the radio signal attenuation with distance, the interference caused by communication within one cell is negligible in a cell sufficiently far removed, and therefore the resource can be reused in this cell. In addition, the resource is typically divided within one cell and between cells by division of the resource in the time domain, the frequency domain and/or the code domain. Different communication systems use different principles for this division. The resource allocation may be static or dynamic dependent on the current load of the communication system, and typically a combination of static and dynamic resource allocation is used.

Hence, it is of the outmost importance for cellular communication systems to optimise the use of the available radio resource. However, the allocation of resource to different services and different mobile stations tend to require complex management and control involving significant signalling. This is particularly unsuitable for efficient resource utilisation in the presence of significant fluctuations in the radio environment.

For example, circuit switch calls predominantly seek to cope with severe fading conditions by changing the communication parameters to ensure a suitable quality. Specifically, calls may be handed over to neighbouring cells. However, handover is a slow process that requires significant signalling between base stations and mobile stations. Therefore, repeated handovers must be avoided and consequently handovers are best suited to permanent changes in the radio environment and less suited for dealing with short term variations. As another example, packet based communications seek to cope with interference variations by sophisticated scheduling algorithms. However, these algorithms require complex signalling and are therefore unsuitable for short term fluctuations in the parameters of the radio environment.

Hence, an improved system for controlling the radio interface resource utilisation would be advantageous and in particular a system allowing for increased flexibility, lower complexity, less signalling overhead, faster operation and/or improved resource utilisation in view of fluctuations in the characteristics of the radio environment would be advantageous.

SUMMARY OF THE INVENTION

Accordingly, the Invention seeks to mitigate, alleviate or eliminate one or more of the above mentioned disadvantages singly or in any combination.

According to a first aspect of the invention there is provided a method of power control for a transmitter in a cellular communication system comprising the steps of in a first mode of operation determining power control data in response to a quality parameter of a communication between a base station and a communication unit, and communicating the power control data between the base station and the communication unit; entering a reduced power mode of operation by communicating power down power control data between the base station and the communication unit; operating in the reduced power mode by communicating power control data corresponding to a reduced transmit power level; and exiting the reduced power mode by communicating power up power control data between the base station and the communication unit.

The invention allows for a reduced interference from a transmitter supporting a communication between a base station and a communication unit. The method enables the advantages of low complexity, high speed and/or low overhead. The method is suitable for controlling transmissions in response to fluctuations in the characteristics of the radio environment. The method enables an improved capacity of the communications system as interference from communications temporarily causing high interference may be temporarily reduced. No signalling in excess of the power control data need be communicated, and the capacity is thus further reduced by the reduction in signalling data. Although the reduced power mode may prevent or reduce the communication capacity of the communication, the reduced interference is likely to benefit other communications thereby increasing the capacity of the communication system as a whole.

According to a feature of the invention, the power control is an uplink power control and the power control data is transmitted from the base station to the communication unit. The method may advantageously be applied to control the transmit power of a communication unit. This allows for the fixed network and base station to control the operation of the communication unit to suit the needs of the communication system as a whole. A standard communication unit meeting the current power control standards may be used without any modifications. Hence, deployment in existing already deployed communication systems is feasible without modifications to the communication units. The communication unit need not know that a reduced power mode is entered.

According to a feature of the invention, the power control is a downlink power control and the power control data is transmitted from the communication unit to the base station. The method may advantageously be applied to control the transmit power of a base station. This allows for individual communication units to control the operation of the base station to suit the current radio environment.

According to a feature of the invention, the reduced transmit power level is substantially zero. This allows for the interference reduction to be maximised and therefore allows for the maximum benefit to other communications. It furthermore enables a simple implementation.

According to a feature of the invention, the power control data communicated in the reduced power mode is power down control values. This allows for a simple method of reducing the transmit power in the reduced power interval A continuous transmission of power control values will for a sufficiently long duration of the reduced power mode result in the transmit power being reduced to substantially no transmit power. Simply transmitting power down control values removes any requirement for determining suitable power control values for meeting a given criterion and thus allows for very simple operation.

According to a feature of the invention, the reduced transmit power level allows a reduced data rate communication between the communication unit and the base station. This allows for communication to be exchanged while reducing the interference caused. Specifically, this may allow for control and signalling information to be maintained during the reduced power mode.

According to a feature of the invention, the step of exiting comprises transmitting power up power control data until the transmit power corresponds to a power level determined in response to the quality parameter. This allows for the transmit power to quickly be returned to a suitable level for supporting the subsequent communication.

According to a feature of the invention, the step of exiting comprises transmitting power up power control data until the transmit power corresponds to a power level corresponding to the power level prior to entering the reduced power mode. This allows for the transmit power to quickly be returned to a suitable level for supporting the subsequent communication without requiring that a suitable power control level is first determined.

According to a feature of the invention, a duration of the reduced power mode is less than a data retransmission interval associated with the communication between the communication unit and the base station. This allows for any data lost during the reduced power mode to be recovered by retransmissions. Specifically, a retransmission scheme may be specified for the communication and thus re-transmission may automatically recover any lost data during a limited duration reduced power mode operation.

According to a feature of the invention, the method further comprises the step of determining that a quality level of the communication between the communication unit and the base station cannot be achieved, and in response entering the reduced power mode. Specifically, if the quality level cannot be attained despite communicating power up power control data for a sufficient duration of time, this may be taken as an indication that the transmitter has reached saturation. This is likely to be caused by a significant fade condition, which may soon disappear. The quality level may be an error rate, signal to noise ratio and/or signal to interference ratio. This provides a suitable means of determining that a reduced power mode may advantageously be entered.

According to a feature of the invention, the method further comprises the step of determining that a transmit power of the transmitter exceeds a threshold and in response entering the reduced power mode. The transmit power may be a total transmit power or a transmit power of a resource unit of the transmitter such as a transmit power per code, per carrier or per communication unit. This allows for an efficient means of determining that the radio characteristics are currently disadvantageous for the communication, and that a reduced power mode may advantageously be entered.

According to a feature of the invention, the method further comprises the step of determining that an interference level exceeds a threshold and in response entering the reduced power mode. Specifically, the interference level may be an interference level at the base station, at another base station, at the communication unit and/or at another communication unit. This allows for an efficient means of determining that the radio characteristics are currently disadvantageous for the communication, and that a reduced power mode may advantageously be entered.

According to a feature of the invention, the method further comprises the step of determining that a propagation characteristic exceeds a threshold and in response entering the reduced power mode. Preferably, the propagation characteristic is a path loss of a communication link supporting the communication between the communication unit and the base station.

Parameters and characteristics associated with communication between base stations and communication units are typically frequently determined in cellular communication systems. These characteristics may for example be associated with an interference level, a path loss, a fade condition, a delay spread and/or a noise level. These characteristics may provide an efficient means of determining that the radio characteristics are currently disadvantageous for the communication and that a reduced power mode may advantageously be entered.

According to a feature of the invention, the method further comprises the step of determining that a duration of the reduced power mode exceeds a threshold and in response exiting the reduced power mode. The threshold may specifically relate to a predetermined, fixed or pseudorandom time interval. Hence, the power control may automatically exit the reduced power control after a given duration. This allows for a simple and efficient means of ensuring that the reduced power mode is sufficiently short not to have an unacceptable impact on the communication and that it can follow the fluctuations in the propagation conditions.

According to a feature of the invention, the method further comprises the step of determining that a quality characteristic of a data communication between the communication unit and the base station is improving and in response exiting the reduced power mode. Specifically, it may be determined that a signal to interference ratio, signal to noise ratio or error rate is improving despite the power control being in reduced power mode. This may be an indication that the radio characteristics are improving and may no longer be unfavourable. Hence, it may provide an efficient means of determining that the radio characteristics are currently not disadvantageous for the communication, and that the reduced power mode may advantageously be exited.

According to a feature of the invention, the method further comprises the step of determining that an interference level is below a threshold, and in response exiting the reduced power mode. Specifically, the interference level may be an interference level at the base station, at another base station, at the communication unit and/or at another communication unit. This allows for an efficient means of determining that the radio characteristics may currently not be disadvantageous for the communication, and that the reduced power mode may advantageously be exited.

According to a feature of the invention, the method further comprises the step of determining that a propagation characteristic is below a threshold and in response exiting the reduced power mode. Preferably, the propagation characteristic is a path loss of a communication link supporting the communication between the communication unit and the base station. Parameters and characteristics associated with communication between base stations and communication units are frequently determined in cellular communication systems. These characteristics may for example be associated with an interference level, a path loss, a fade condition, a delay spread and/or a noise level. These characteristics may provide an efficient means of determining that the radio characteristics are currently not disadvantageous for the communication and that the reduced power mode may advantageously be exited.

According to a feature of the invention, the method further comprises the steps of determining an expected interference level for a plurality of communication units including the communication unit; determining a total expected interference level; and entering the communication unit into the reduced power mode if the total expected interference level exceeds a threshold. This allows for an efficient method of allocating radio resource such that an interference threshold is not exceeded.

According to a feature of the invention, the power control is operated in accordance with the $3^{rd}$ Generation Partnership Project Technical Specification TS 25.214. Hence, an improved method of power control is provided allowing for increased performance and/or capacity of a $3^{rd}$ generation cellular communication system.

According to a second aspect of the invention, there is provided: an apparatus for power control for a transmitter in a cellular communication system, the apparatus comprising: means for, in a first mode of operation, determining power control data in response to a quality parameter of a communication between a base station and a communication unit, and communicating the power control data between the base station and the communication unit; means for entering a reduced power mode of operation by communicating power down power control data between the base station and the communication unit; means for operating in the reduced power mode by communicating power control data corresponding to a reduced transmit power level; and means for exiting the reduced power mode by communicating power up power control data between the base station and the communication unit.

These and other aspects and advantages of the invention will be apparent from and elucidated with reference to the embodiment(s) described hereinafter.

BRIEF DESCRIPTION OF THE DRAWINGS

An embodiment of the invention will be described, by way of example only, with reference to the drawings, in which.

DETAILED DESCRIPTION OF A PREFERRED EMBODIMENT OF THE INVENTION

The following description focuses on an embodiment of the invention applicable to a Universal Mobile Telecommunication System (UMTS). Specifically, the description will concentrate on an embodiment wherein power control is performed in accordance with $3^{rd}$ Generation Partnership Project Technical Specification TS 25.214. However, it will be appreciated that the invention is not limited to this application but may be applied to many other cellular communication systems including for example $2^{nd}$ generation communication systems such as GSM and GPRS based communication systems.

The following description will furthermore focus on a description wherein an uplink power control is used to reduce the transmit power of a communication unit. However, it will be apparent that the invention is not limited to this application and is for example equally applicable to down link power control. A method of power control in accordance with an embodiment of the invention. will in the following be described with reference to the cellular communication of FIG. 1.

In cellular communication systems, it is imperative to manage the radio links 119, 123, 127, 129 between the base stations 109, 111, 113, 115 and communication units 117, 121, 125 such that the resource used by a given communication link is as low as possible. Thus, it is important to minimise the interference caused by the communication to or from a communication unit 117, 121, 125, and consequently it is important to use the lowest possible transmit power. As the required transmit power depends on the instantaneous propagation conditions, transmit powers are dynamically controlled to closely match the conditions. For this purpose, the base stations 109, 111, 113, 115 and communication units 117, 121, 125 operate power control loops, where the receiving end reports information on the receive quality back to the transmitting end, which in response adjusts it's transmit power.

In UMTS, the downlink power control operates by the communication unit reporting the error rate of the received signal, and the base station adjusting the transmit power in response. Specifically, a base station decreases the transmit power, if the error rate is below a desired downlink error threshold, and increasing it otherwise. In the uplink direction, the base stations measure the received error rate and compare it to an uplink error threshold. If the error rate is below the uplink error threshold, the base station transmits power down power control data to the communication unit. If the error rate is above the uplink error threshold, the base station transmits power up power control data to the communication unit.

In UMTS, both an inner power control loop and an outer power control loop is implemented. Inner loop power control operates as follows. The receiving entity of a radio link measures the received Signal to Interference Ratio (SIR), and compares it to a locally stored target SIR. A command is sent back to the transmitter to increase transmitted power if the measured SIR is less than the target. Conversely, if the measured SIR is greater than the target, a command is sent to the transmitter to decrease the transmitted power.

The target SIR is set by a known feature called outer loop power control. Its function is to maintain the frame error rate (FER) of the radio link at or below a given value or threshold. The frame error rate of the received signal is measured by one of a number of known techniques, and the SIR target is adjusted to try to ensure that the FER is at or below the given value.

In the preferred embodiment, a base station 111 is communicating with a communication unit 121 over a radio link 123. The base station 111 comprises means for determining power control data. The power control data is communicated to the communication unit 121 as Transmit Power Control (TPC) bits in the downlink communication is well known in art. The TPC bits are set to 00 to decrease the transmit power of the transmitter of the communication unit (power down) and to 11 to increase the transmit power (power up). TPC bits are transmitted at a frequency of 1.5 kHz and accordingly the communication unit 121 receives a power up or a power down power control data values every 0.667 mseconds. Hence, the transmit power of the communication unit 121 is accurately controlled to meet the fluctuating propagation conditions.

In the preferred embodiment, the base station is operable to operate in a first mode of operation wherein power control data is determined in response to a quality parameter of a communication from the communication unit 121 to the base station 111. In this mode, the base station 111 operates a power control in accordance with the technical specification TS 25.214 Specifically, the quality parameter is a SIR as described above. The determined power control data is communicated to the communication unit by the downlink transmissions. Specifically, TPC bits are determined and transmitted.

In the preferred embodiment, the base station furthermore comprises means for determining that the current propagation conditions for the communication from the communication unit 121 to the base station 111 are bad. Specifically, the base station 111 may determine that a propagation loss is unacceptably high.

In response to this detection, the base station 111 enters a reduced power mode of operation. It will be appreciated that for this embodiment the reduced power mode refers to the base station 111 controlling the transmit power of the communication unit to be reduced and does not relate to a transmit power of the base station 111. The base station 111 enters this mode by sending a stream of power down power control data values. Hence, all TPC bits are set to 00 for a given duration. This causes the transmit power of the communication unit 121 to be significantly reduced and the communication unit 123 thus enters a reduced power mode of operation.

The base station 111 operates in the reduced power mode by transmitting power control data which corresponds to a reduced transmit power level. Specifically, only power down control values may be communicated thereby minimising the transmitted power. Accordingly, the interference caused by the communication unit 121 is significantly reduced.

In the preferred embodiment, the base station 111 operates in the reduced power mode for a given time interval after which it exits the reduced power mode. The base station 111 exits the reduced power mode by communicating power up power control data from the base station to the communication unit. Specifically, the TPC bits are set to 11 for a given interval or alternatively or additionally the base station 111 exits the reduced power mode by instantly returning to the first mode of operation. As the transmit power is below the required level, the standard operation of the power control in the first mode will cause the base station 111 to transmit power up power control data.

Hence, in response to unfavourable propagation conditions, the communication unit is entered into a reduced power mode for a short interval. Although this may cause loss of data for the communication unit 121, it also reduces the interference significantly thereby allowing for the communication capacity of the entire communication system to be increased.

In particular for a CDMA based cellular communication system, the radio resource used by communicating a given service is significantly higher for unfavourable propagation conditions in comparison to favourable ones. Therefore, entering a reduced power mode when the propagation conditions are unfavourable may significantly reduce the resource usage by the communication unit 121. In many cases, any data loss during the reduced power mode interval is insignificant. Specifically, communication systems such as UMTS comprise re-transmission schemes wherein any lost data is re-transmitted at a later time.

Figure 2:
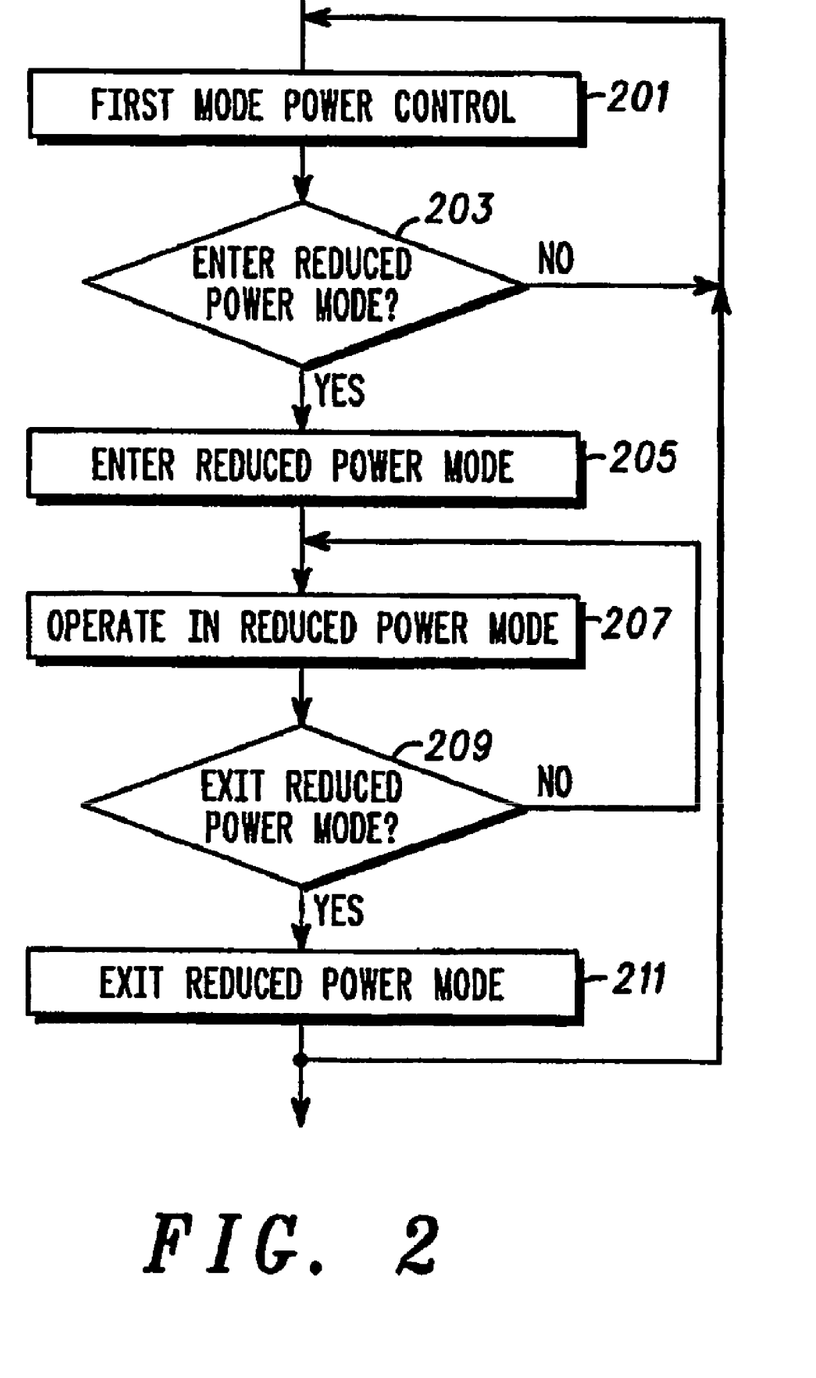
FIG. 2 is an illustration of a flow chart for a method of power control in accordance with an embodiment of the invention.

FIG. 2 is an illustration of a flow chart for a method of power control in accordance with a preferred embodiment of the invention. The method is applicable to a cellular communication system such as that illustrated in FIG. 1. The method will in the following be described in more detail with reference to the cellular communication of FIG. 1.

In step 201, the base station 111 operates in a first mode of operation. The base station 111 performs a standard power control algorithm in accordance with TS 25.214 as is well known in the art. Specifically, the base station determines the uplink SIR and generates power up data if the determined SIR is below a preferred value and power down data if it is above the preferred value. The generated power control data is transmitted to the communication unit 121 which increases or decreases the transmit power accordingly.

Step 201 is followed by step 203 wherein it is determined whether the base station 111 should enter a reduced power mode or remain in the first mode of operation. If it is determined that the base station 111 should remain in the first mode, the method continues by iterating step 201. If it is determined that the base station 111 should enter a reduced power mode, the method continues in step 205.

It is within the contemplation of the invention that any suitable method for instigating the reduced power mode may be used. However, in the preferred embodiment the base station enters the reduced power mode operation in response to determining that the conditions for the communication between the communication unit and the base station have become unfavourable.

In one embodiment, step 203 comprises determining if the transmitter of the communication unit exceeds a given threshold. This may in some embodiments be determined by the communication unit periodically transmitting information of the current transmit value. Specifically, it may be determined if the transmitter is in saturation. If so, the transmit power of the communication unit cannot be increased further. Hence, the caused interference is at a maximum level. This situation is likely to occur for deep fades, and by entering a reduced power mode the base station may temporarily reduce the transmit power of the communication unit thereby reducing the interference.

Alternatively or additionally, step 203 may comprise determining that a quality level of the communication between the communication unit and the base station cannot be achieved. Specifically, the base station 111 may continuously determine the received error rate or SIR. If a given threshold cannot be achieved despite continuous transmission of power up power control data, this is an indication that the transmitter of the communication unit 121 is at maximum power, and that the radio conditions are such that an acceptable quality cannot be achieved. Hence, this allows for the base station to determine that a reduced transmit power mode may advantageously be entered based on only the communication signal received from the communication unit 121.

Alternatively or additionally, step 203 may comprise determining that an interference level exceeds a threshold. For example, the base station 111 may continuously measure the total interference level at the base station 111. If the interference level increases above a given threshold, the base station 111 becomes overloaded, and in response it may be advantageous to temporarily enter a reduced power mode for one or more communication units. This will temporarily reduce the interference. In many cases, the radio propagation characteristics have changed when the communication unit exits the reduced power mode, thereby allowing communication without the interference level being exceeded.

As another example, the interference threshold may be related to another communication unit. For example, it may be known that two communication units are close to each other, and if the interference level for one of the communication units is above a given level, the base station may enter a reduced power mode for the other communication unit thereby reducing the interference level. This may for example provide a short reduced interference period that may be used to ensure reliable signalling to the communication unit, for example to instigate a handover of the communication unit.

Alternatively or additionally, step 203 may comprise determining that a propagation characteristic exceeds a threshold. For example, in some communication systems, the transmit power level of the communication unit may be communicated to the base station. In response, the base station may determine the path loss of the communication link as the difference between the transmitted power level and the received signal level If this propagation loss exceeds a threshold, it may be advantageous to temporarily suspend the communication until the path loss is reduced and the base station may enter a reduced power mode for the communication unit.

In step 205, the base station enters the reduced power mode by communicating power down power control data to the communication unit. In the preferred embodiment, the base station continually transmits TPC 00 bits. This causes the communication unit to reduce the transmit power regardless of the current quality of the communication. Hence, the communication unit similarly enters a reduced power mode.

Step 205 may continue until the transmit power has reached a given level or for a given time interval guaranteed to reduce the transmit power level to a sufficient level.

Step 205 is followed by step 207 wherein the base station and communication unit operate in the reduced power mode. The base station operates in this mode by communicating power control data corresponding to a reduced transmit power level. Specifically, the base station communicates power up and power down control messages to meet a criterion that results in a reduced transmit power of the communication unit.

In a simple embodiment, the base station simply transmits a stream of power down control values. This results in the transmit power being reduced until the transmit power is minimised, which specifically may correspond to a substantially zero transmit power. The further power down control values will result in the transmit power being maintained at the minimum level. In this embodiment, steps 205 and 207 are equivalent and comprise continuously transmitting power down control values.

In more complex embodiments, step 207 comprises transmitting power control values such that communication is still possible between the communication unit and the base station. Hence, the transmit power is reduced but not to a substantially zero transmit power level. For example, a power control similar to the first mode power control may be operated but for a lower quality requirement. For example, a lower SIR may be required resulting in lower transmit power but increased error rates. However, this may in some communication systems be compensated by reducing the data rate of the communication. For example, an increased forward error correcting scheme may be used.

Step 207 is followed by step 209 wherein it is determined whether the base station 111 should remain in the reduced power mode or exit to the first mode of operation. If it is determined that the base station 11 should remain in the reduced power mode, the method continues by iterating step 207. If it is determined that the base station 111 should exit the reduced power mode, the method continues in step 211.

In one embodiment, step 209 comprises determining that a duration of the reduced power mode exceeds a threshold. For example, a duration of the reduced power mode may be predetermined. Step 209 checks whether the current duration of the reduced power mode exceeds this predetermined value and if so proceeds to step 211. In this embodiment, the duration of the reduced power mode may be of a fixed duration. Hence, the base station 111 enters a reduced power mode in response to detecting an unfavourable propagation characteristic and exits the reduced power mode after a fixed duration. The fixed duration is preferably sufficiently long to have a reasonably high probability of the propagation characteristics having changed. If not, the base station may detect this and enter the reduced power mode again.

Preferably, the fixed duration is less than a data re-transmission interval associated with the communication between the communication unit and the base station. Many communication systems comprise re-transmission schemes for re-transmitting lost data. For example, a packet data scheme may comprise re-transmitting any data packets that have not been acknowledged by the receiving end. Hence, if the reduced power mode is of a duration less than the data re-transmission interval in which lost data packets may be re-transmitted, any loss of data during the reduced power mode may be compensated by retransmissions.

Alternatively or additionally, step 209 comprises determining that a quality characteristic of a data communication between the communication unit and the base station is improving. As the transmit power of the communication unit reduces, it is expected that the error rate increases and the SIR reduces accordingly. However, if the base station detects that either the error rate decreases or the SIR increases, this is an indication that the propagation characteristics have improved for the communication. Accordingly, communication is possible without causing excessive interference and the reduced power mode is exited.

Alternatively or additionally, step 209 comprises determining that an interference level is below a threshold. For example, the base station may determine that the total received interference level falls below a level corresponding to full loading and that accordingly resource is available for continuing the communication with the communication unit in the normal mode of operation.

Alternatively or additionally, step 209 comprises determining that a propagation characteristic is below a threshold. Specifically, the base station may continuously determine the propagation loss from knowledge of the received signal level and the reduced transmit power of the communication unit. If the propagation loss decreases below a given threshold the communication may be continued without causing excessive interference and accordingly the reduced power mode is exited.

In step 211, the base station exits the reduced power mode by communicating power up power control data to the communication unit. In the preferred embodiment, the base station transmits power up power control data until the transmit power of the communication unit corresponds to a power level corresponding to the power level prior to entering the reduced power mode. Hence, the base station determines how many power up control commands that need to be transmitted in order for the transmit power to be equal to that before entering the reduced power mode. This will result in a high probability of the transmit power being returned to a suitable level.

In another embodiment, power up power control data is transmitted until the transmit power corresponds to a power level determined in response to the quality parameter. Specifically, power up messages may be transmitted until a given SIR or error rate is achieved.

In one embodiment, the reduced power mode is used in resource allocation. For example, the reduced power mode may be used for scheduling packet data traffic in the uplink direction.

In one such embodiment, scheduling occurs at the beginning of a Transmission Time Interval (TTI). Using the historical uplink transmission information the probability distribution may be estimated of the probability of an active communication unit transmitting a data packet in a TTI. Further, the conditional transmission probability, p(k+1|k), of an active communication unit communicating during the next TTI given that it has been busy for the past k TTIs may be determined. In addition an expected interference level may be determined for each active communication unit.

In the embodiment, the total expected interference level is determined at the beginning of a TTI taken into account the probability of transmission and the expected interference level if each active communication unit. Specifically, the total expected interference level is determined as:

$$\hat{I}(k) = \sum_{i \in \Theta(k)} p_t(k+1 \mid k) I_t(k)$$

where $I_i(k)$ is the expected interference level of communication unit i and $\Theta(k)$ is the index set of all active communication units.

If $\hat{I}(k)$ is greater than a given threshold $I_{TH}$, then one or more communication units are entered into a reduced power mode. Otherwise, all communication units are allowed to proceed with normal communication.

If $\hat{I}(k)$ is greater than the threshold $I_{TH}$, the base station enters an reduced power mode for the communication unit with the highest probability of transmission $p_i(k+1|k)$. The total expected interference level is re-calculated taking this into account. The process is repeated for additional communication units until the total expected interference level is below $I_{TH}$.

In other embodiments, communication units may be selected for reduced power mode operation in response to the interference contribution of that communication unit or in response to both the interference contribution and the probability of transmission It will be appreciated that the embodiments described above have been concerned with uplink power control and controlling a transmit power of the remote communication units. However, it will be apparent that the invention is equally applicable to downlink power control and the control of a transmit power of a base station. In this case, the controlled transmit power is preferably the transmit power associated with the communication to the communication unit.

The above description has for clarity and brevity focussed on entering reduced power mode for one communication unit. However, it will be apparent that the method may be repeated for a plurality or indeed all communication units of the cell or the communication system If the method is continuously applied to all communication units served by the base station, there will be a tendency to temporarily suspend communication units operating with unfavourable propagation conditions and consequently causing a disproportional interference. Hence, the communication units will be biased towards communication when the caused interference is low, and thus the capacity of the base station may be increased significantly.

The invention can be implemented in any suitable form including hardware, software, firmware or any combination of these. However, preferably, the invention is implemented as computer software running on one or more data processors and/or digital signal processors. The elements and components of an embodiment of the invention may be physically, functionally and logically implemented in any suitable way. Indeed the functionality may be implemented in a single unit, in a plurality of units or as part of other functional units. As such, the invention may be implemented in a single unit or may be physically and functionally distributed between different units and processors.

Although the present invention has been described in connection with the preferred embodiment, it is not intended to be limited to the specific form set forth herein. Rather, the scope of the present invention is limited only by the accompanying claims. In the claims, the term comprising does not exclude the presence of other elements or steps. Furthermore, although individually listed, a plurality of means, elements or method steps may be implemented by e.g. a single unit or processor. Additionally, although individual features may be included in different claims, these may possibly be advantageously combined, and the inclusion in different claims does not imply that a combination of features is not feasible and/or advantageous. In addition, singular references do not exclude a plurality. Thus references to "a", "an", "first", "second" etc do not preclude a plurality.

The invention claimed is:

1. A method of power control for a transmitter in a cellular communication system comprising the steps of:
   determining power control data in response to a quality parameter of a communication between a base station and a communication unit;
   communicating the power control data between the base station and the communication unit;
   determining that a transmit power of the transmitter exceeds a threshold;
   determining that a quality level of the communication between the communication unit and the base station cannot be achieved when the transmit power of the transmitter exceeds the threshold;
   in response to determining that a quality level of the communication between the communication unit and the base station cannot be achieved when the transmit power of the transmitter exceeds the threshold, entering a reduced power mode of operation by communicating power down power control data between the base station and the communication unit;
   operating in the reduced power mode by communicating power control data corresponding to a reduced transmit power level that allows communication at a reduced data rate between the communication unit and the base station; and
   exiting the reduced power mode when a quality characteristic of a data communication between the communication unit and the base station is improving by communicating power up power control data between the base station and the communication unit.

2. A method as claimed in claim 1 wherein the power control is an uplinik power control and the power control data is transmitted from the base station to the communication unit.

3. A method as claimed in claim 1 wherein the power control is a downlink power control and the power control data is transmitted from the communication unit to the base station.

4. A method as claimed in claim 1 wherein the reduced transmit power level is substantially zero.

5. A method as claimed in claim 1 wherein the power control data communicated in the reduced power mode is power down control values.

6. A method as claimed in claim 1 wherein the step of exiting comprises transmitting power up power control data until the transmit power corresponds to a power level determined in response to the quality parameter.

7. A method as claimed in claim 1 wherein the step of exiting comprises transmitting power up power control data until the transmit power corresponds to a power level corresponding to the power level prior to entering the reduced power mode.

8. A method as claimed in claim 1 wherein a duration of the reduced power mode is less than a data re-transmission interval associated with the communication between the communication unit and the base station.

9. A method as claimed in claim 1 further comprising the step of determining that an interference level exceeds a threshold and in response entering the reduced power mode.

10. A method as claimed in claim 1 further comprising the step of determining that a propagation characteristic exceeds a threshold and in response entering the reduced power mode.

11. A method as claimed in claim 10 wherein the propagation characteristic is a path loss of a communication link supporting the communication between the communication unit and the base station.

12. A method as claimed in claim 1 further comprising the step of determining that a duration of the reduced power mode exceeds a threshold and in response exiting the reduced power mode.

13. A method as claimed in claim 1 further comprising the step of determining that an interference level is below a threshold and in response exiting the reduced power mode.

14. A method as claimed in claim 1 further comprising the step of determining that a propagation characteristic is below a threshold and in response exiting the reduced power mode.

15. A method as claimed in claim 14 wherein the propagation characteristic is a path loss of a communication link supporting the communication between the communication unit and the base station.

16. A method as claimed in claim 1 further comprising the steps of:

determining an expected interference level for a plurality of communication units including the communication unit;

determining a total expected interference level; and entering the communication unit into the reduced power mode if the total expected interference level exceeds a threshold.

17. An apparatus for power control for a transmitter in a cellular communication system, the apparatus comprising:

means for determining power control data in response to a quality parameter of a communication between a base station and a communication unit;

means for communicating the power control data between the base station and the communication unit;

means for determining that a transmit power of the transmitter exceeds a threshold;

means for determining that a quality level of the communication between the communication unit and the base station cannot be achieved when the transmit power of the transmitter exceeds the threshold;

means for entering a reduced power mode of operation by communicating power down power control data between the base station and the communication unit, in response to the determining that a quality level of the communication between the communication unit and the base station cannot be achieved when the transmit power of the transmitter exceeds the threshold;

means for operating in the reduced power mode by communicating power control data corresponding to a reduced transmit power level that allows communication at a reduced data rate between the communication unit and the base station; and means for exiting the reduced power mode when a quality characteristic of a data communication between the communication unit and the base station is improving by communicating power up power control data between the base station and the communication unit.

* * * * *